UNITED STATES PATENT OFFICE.

JOHN R. MacMILLAN, OF NIAGARA FALLS, NEW YORK, ASSIGNOR TO NIAGARA ALKALI COMPANY, OF NIAGARA FALLS, NEW YORK, A CORPORATION OF NEW YORK.

PROCESS OF MAKING SODIUM HYPOCHLORITE.

1,383,224.     Specification of Letters Patent.     Patented June 28, 1921.

No Drawing.     Application filed July 29, 1920. Serial No. 399,763.

*To all whom it may concern:*

Be it known that I, JOHN R. MACMILLAN, a citizen of the United States, residing at Niagara Falls, in the county of Niagara and State of New York, have invented certain new and useful Improvements in Processes of Making Sodium Hypochlorite, of which the following is a specification.

This invention relates to processes of making sodium hypochlorite; and it comprises a method of making a pure, stable solution of sodium hypochlorite wherein chlorin is allowed to act on a magma or mixture of lime and solution of sodium carbonate until chlorination has gone to the extent desired and the solution is separated from the insoluble bodies formed; all as more fully hereinafter set forth and as claimed.

As is well known, chlorin reacts with water to form hypochlorous and hydrochloric acids in equal molecular proportions as primary products; and in the presence of an alkali the two acids may combine therewith to form solutions containing a chlorid and a hypochlorite. It is desirable to form such a solution containing sodium hypochlorite ("Labarraque's liquor" or "chlorid of soda" solution) of a pure and stable nature for use in medicine, disinfecting, bleaching, etc. Many methods have been proposed and are in use for making such solutions; but these methods all have disadvantages of one kind or another. Sometimes the solution is made by a simple double decomposition reaction between sodium carbonate (soda ash) and bleaching powder in the presence of water; but this does not give as definite and as stable a solution as is wanted. Bleaching powder is an unstable and indefinite material, since it decomposes more or less during storage, and it is moreover a difficult material to handle. Direct introduction of chlorin into caustic soda solutions develops heat and is difficult to control in the case of solutions of any strength or in large volumes so as to prevent the occurrence of side reactions wasting alkali and chlorin and developing products not wanted in the liquor. Caustic soda is, furthermore, relatively expensive.

In the present invention I have devised a cheap, ready and economical method of making stable solutions of sodium hypochlorite. In so doing, I lead the chlorin into a mixture of lime and sodium carbonate solution. A solution of sodium carbonate or soda ash in contact with lime, of course, tends to causticize, yielding caustic soda in solution and a precipitate of calcium carbonate; but in the cold the reaction is tolerably slow; the formation of caustic soda in solution taking place slowly and progressively. On leading chlorin into such a mixture, it reacts primarily with such caustic soda as is present in the usual manner; that is, $Cl_2$ forms NaCl and NaOCl, at the expense of 2NaOH. But since the development of caustic soda is progressive, the solution is not heavily alkaline and does not heat up; both results tending to repress wasteful side reactions. A soda ash solution containing lime admixed therewith, or in suspension therein, kept in agitation and subjected to the action of chlorin gas introduced at a moderate rate chlorinates easily and without the development of much heat. The reaction is readily controllable and does not lead to the production of substantial amounts of by-products. Chlorin should be lead in at a fairly moderate rate. When the desired amount of chlorin has been introduced, the agitation may be discontinued, the sludge of calcium carbonate allowed to settle and the clear liquor decanted. It may be filtered or centrifuged; but decantation ordinarily gives a good and clear liquid product. As the lime employed, it is best to use one high in calcium; what is sometimes known as a "fat lime." "Lean limes" containing much magnesia, although they may be used, do not work as well. The separated sludge of carbonate of lime may be washed and the washings used in dissolving soda ash (sodium carbonate) for another operation. It is best to proportion the materials used so that the final solution of sodium hypochlorite and sodium chlorid is left with about 5 per cent. of excess alkalinity; this helping to give stability to the solution. All the operations are best done at as low a temperature as is convenient.

The reaction by which sodium carbonate in solution is converted into caustic soda by the action of lime at low temperatures is markedly endothermic; and there is a progressive absorption of heat during the whole action for this reason. This aids materially in keeping down the temperatures of the mass during chlorination.

In a specific embodiment of the present process I use for producing my alkaline liquor about 65 parts by weight of a good burnt lime and 125 parts of commercial soda ash, together with the amount of water sufficient to produce a sodium hypochlorite solution of the strength desired. It is advantageous to slake the lime in the water and wait for the mixture to cool before adding the soda ash. Instead of using quicklime, ordinary commercial forms of hydrated lime may be used and offer the advantage that they give no great development of heat on admixture with water. The amount of water they contain is of course allowed for in proportioning the ingredients. Chlorin from any convenient source, such as an electrolytic cell, commercial liquid chlorin, etc., is now led into the magma or mixture under agitation and at such a rate as gives a good absorption without an undue development of heat. Introduction of chlorin is ordinarily discontinued when the solution displays about 5 per cent. residual alkalinity, calculated as NaOH. With the amounts of lime and soda ash indicated, about 71 parts by weight of elemental chlorin are required. After the desired amount of chlorin has been introduced, agitation is discontinued and the liquid allowed to settle. The clear liquor is then drawn off into tanks or containers and the residual sludge of calcium carbonate is washed with water. These washings may be used for dissolving or diluting succeeding batches. The washed calcium carbonate which is in a fine, pure form, may be used as a pigment, or as a reagent in other processes, or it may be reburned to form quicklime.

What I claim is:

In the manufacture of sodium hypochlorite solution, the process which comprises leading chlorin into a mixture of lime and sodium carbonate solution, and separating the calcium carbonate produced from the resultant hypochlorite solution.

In testimony whereof, I have hereunto affixed my signature.

JOHN R. MacMILLAN.